April 16, 1963
A. STIERINGER
3,085,485
PHOTOGRAPHIC CAMERA
Filed Nov. 15, 1961
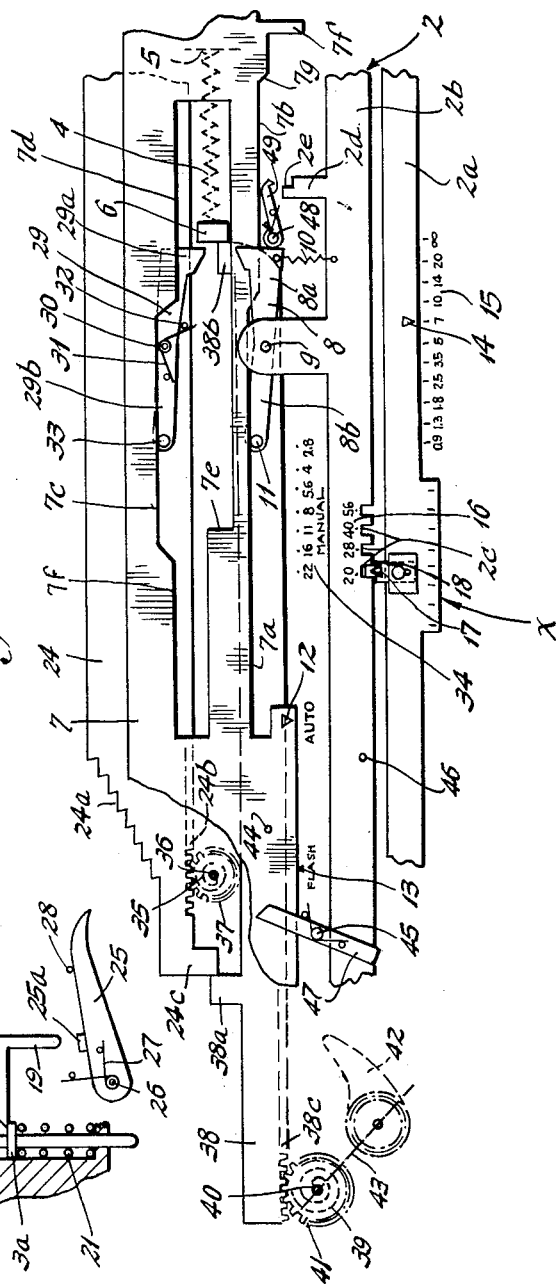
INVENTOR.
Albert Stieringer
BY
Arthur A. March
ATTORNEY United States Patent Office 3,085,485
Patented Apr. 16, 1963

3,085,485
PHOTOGRAPHIC CAMERA
Albert Stieringer, Schomberg, Germany, assignor to Alfred Gauthier, G.m.b.H., Calmbach (Enz), Germany, a corporation of Germany
Filed Nov. 15, 1961, Ser. No. 152,397
Claims priority, application Germany Nov. 16, 1960
8 Claims. (Cl. 95—10)

This invention relates to photographic cameras wherein the lens assemblage includes a distance or range setting mechanism and an adjustable diaphragm, the latter occupying, for the non-influenced condition of the camera release member, a starting position which corresponds to either the largest or the smallest diaphragm aperture and being set at a predetermined diaphragm value under spring action and in response to actuation of said release member.

An object of the invention is to provide a novel and improved camera of the above type, wherein it is possible selectively to carry out either flash exposures with the diaphragm adjusted automatically in response to setting of the range or distance setting member, or else non-flash exposures, all by means of an organization which is simple and economical to produce and provides complete flexibility and freedom of choice as regards the selection of the type of exposure which is to be made. Considering such selection, no interference will be had due to the existing operating condition of the camera and of the control devices which are associated with the diaphragm. In other words, the camera can be changed from one kind of exposure to the other independently of the existing positions and settings of the various parts or components, including those involved with the diaphragm.

This is accomplished, in accordance with the invention, by an organization comprising a movable stop which is connected to the range setting member and which cooperates with a counterstop on the diaphragm adjusting mechanism and thus limits the setting motion of the same in accordance with the setting of the range or distance setting member in the case where automatic diaphragm adjustment is to be had with flash exposures. The invention further provides in said organization a manually operable setting and selector member which can be placed in a "flash" position and also in at least one other position or range (identified by setting markings) wherein the said movable stop mentioned above is shifted out of the path of movement of the cooperable counterstop, this occurring as a consequence of placement of the manually operable setting and selector member into said one more position or positions differing from the "flash" position and being effected by a disconnection or discontinuance of the control influence of the range setting member.

Thus, when making flash exposures utilizing a camera as constructed in accordance with the invention, it is merely necessary to set a manually operable setting and selector member in the "flash" position, and to then depress the camera release member, whereupon the diaphragm aperture will be automatically adjusted without requiring any attention on the part of the operator, at the correct value as determined by the position of the range-setting member.

This surprisingly simple method of operating the camera, which is also dependable and economical of time and mental effort where flash exposures are to be made, and which also avoids costly devices of complicated structure and intervention or interference with the structure of the diaphragm mechanism, is obtained essentially by providing the movably mounted stop on the range-setting member, which stop is adapted to cooperate with the counterstop of the diaphragm mechanism and which in so doing limits the setting motion of the diaphragm to a value as determined by the position of the range-setting member. In order to eliminate or discontinue the control influence of the range-setting member, where it is desired to effect exposures without the use of flash bulbs or devices, the manually operable setting and selector member is shifted into one of a number of marked setting positions which are different from the "flash" position, and this causes a shifting of the said movable stop to a position out of the path of movement of the counterstop of the diaphragm. The device of the present invention is thus characterized by an optimally uncomplicated, space- and expenditure-saving structure, and by a simple and functionally dependable mode of operation. Another special advantage of this camera as provided by the invention consists in the complete flexibility and freedom of choice which characterizes the switching or adapting of the camera for the different kinds of exposure. The selection or switching may be readily effected without regard for the operating condition of the camera or any condition of the control devices which cooperate with the diaphragm.

In the case of effecting such automatic setting of the diaphragm with flash exposures, the various flash lamps or bulbs of different brightness or candle power can be taken into account in an uncomplicated manner, by arranging the distance setting member in the form of two relatively adjustable components or parts the first of which can be set with respect to a range scale on the lens assemblage whereas the second member carries the movable stop which controls the diaphragm. With such organization, for the purpose of setting the two parts at different relative positions, an identification mark scale of flash-lamp types is associated with one of the members and a setting or index mark for the said scale is associated with the other member.

For the purpose of effecting an automatic setting of the diaphragm not only where flash exposures are to be made but also and equally advantageously where daylight exposures are to be made, involving dependence on prevailing light conditions, a further construction in accordance with the invention provides another or additional stop for the diaphragm adjusting mechanism, which additional stop is movably carried on an automatic control member connectable to a light intensity measuring device, the said additional stop being also shiftable into the path of movment of the counterstop connected with the diaphragm adjusting mechanism. Such shifting is effected in response to placing the manually operable setting and selector member at a setting position which is identified by the word "auto" and which differs from the "flash" position.

This organization effects, in a simple, easily understood and economical manner, an automatic setting of the diaphragm both in the case of daylight exposures wherein the setting is accomplished by a light intensity measuring device and in the case of flash exposures wherein the setting is effected in response to placement of the range or distance setting member in an adjusted position. In both instances a similar principle of operation is used, involving movable stops which are cooperable with a counterstop of the diaphragm adjusting mechanism, the said movable stops being respectively on the range setting member and on the control member of the automatic exposure regulator.

For the purpose of carrying out still other kinds of exposures, as for example B-exposures, in a camera constructed in accordance with the invention it is moreover of advantage if the size of the diaphragm aperture can be manually as well as automatically adjusted. Such manual adjustment of the diaphragm can be obtained without substantial additional expenditure by arranging the manually operable setting and selector member to also have a "manual" setting range identified by a diaphragm scale and which differs from the above-mentioned "flash" and "auto" positions, and by also providing a stop on the manual setting and selector member, which is cooperable with the said counterstop of the diaphragm adjusting mechanism when the selector is placed in the "manual" setting range.

In order to prevent a situation where the range setting member may mistakenly remain in a position wherein it cannot effect the required adjustment of the diaphragm for the type of flash lamp used, there is further provided in accordance with the invention a safety device which shifts the range setting member into the necessary or required operative range in response to the manually operable setting and selector member being placed in the "flash" position.

A functionally dependable and simple construction for said safety device is had by providing on the manually operable setting and selector member two drivers or catches which are cooperable with that part of the range setting member which carries the movable stop for the diaphragm adjusting mechanism. Upon the manually operable setting and selector member being placed in the "flash" position, one driver or catch is operative on the range setting member to shift the latter, in response to the movement of the selector member to such "flash" position and in the same direction as said movement. The other driver or catch is operative to shift the range setting member in an opposite direction or counter to the direction of movement of the selector member, through a movement-reversing device which is connected therewith.

The motion-reversing device may be economically constituted as a two-armed lever which is pivotally positioned on a fixed part of the camera, one arm of the lever being located in the path of movement of the cooperable driver or catch on the selector whereas the other arm cooperates with a projection, as for example a projecting pin, which is provided on that part of the range-setting member which carries the movable stop for the diaphragm adjusting mechanism.

In order to make sure that, when flash exposures are to be made, the permissible range of adjustment of the distance-setting member as determined by the diaphragm aperture and the type of flash lamp is not exceeded, a further safety device may also be provided, comprising a member which is shiftable into an operative position in response to setting of the manually operable setting and selector member in the "flash" position, and which in the case of flash exposures prevents the range setting member from moving beyond the said permissible range.

In the accompanying drawings, wherein there is illustrated an embodiment of the invention:

FIG. 1 shows diagrammatically the different parts of the control mechanism of a camera as provided by the invention.

FIG. 2 is a schematic circuit diagram and diagrammatic representation of portions of the automatic exposure regulator of the camera.

In FIG. 1 the case or housing of the camera is represented by the numeral 1. The camera has a well-known lens assemblage (not shown for reasons of clarity of illustration) which includes a range or distance setting member 2. The lens assemblage also has a settable diaphragm (not shown in the drawings) which occupies, for the non-influenced state or condition of rest of the camera release member 3, a starting position corresponding to the largest diaphragm aperture (aperture size).

The camera has an automatic exposure regulator which may be the same as the type illustrated and described in the copending application of Waldemar T. Rentschler, Serial No. 126,630, filed July 25, 1961, and entitled "Photographic Camera Having Automatic Diaphragm Setting Device," the said application and the invention set forth therein being owned by the assignee of the present invention and application. Such exposure regulator may comprise a photo-electric element P as shown in FIG. 2, connected through a rheostat R with a galvanometer-type measuring instrument G, the latter having a needle or pointer 23 which deflects in accordance with the intensity of the prevailing daylight. The position of the deflected needle 23 is indicative, therefore, of the light intensity and this is used to automatically determine the diaphragm aperture. Such automatic adjustment of the diaphragm takes place in response to actuation of the camera release member 3. For this purpose, the diaphragm is biased by a spring 4 (indicated in broken lines) which at one end engages a fixed abutment 5 of the camera or the lens assemblage, the other end of the spring engaging an arm 6 (to be described below) of the diaphragm adjusting mechanism.

In accordance with the present invention an automatic setting of the diaphragm, in the case of flash exposures, is effected by the provision of a movable stop 8 which is carried by the range setting member 2 and which cooperates with a counterstop provided on the diaphragm adjusting mechanism, the said counterstop being represented by the arm 6 which is engaged by the spring 4. The shiftable stop 8 thus limits the setting movement of the diaphragm under the action of the spring 4, in accordance with the setting or position of the range setting member 2. Further, the invention provides a manually operable setting and selector member 7 which is settable in various positions, one such position being labelled "auto" as shown in FIG. 1 and another position, labelled "flash," being possible by shifting the setting member 7 to the left from the "auto" position indicated. The "auto" setting is hereinafter referred to as "another" position or setting, considering the "flash" position as the first or initial setting of the member 7. The movable stop 8 carried by the member 2 can be shifted out of the path of movement of the counterstop 6 in response to placing the manually operable setting and selector member 7 in any position which is different from the "flash" position, this being for the purpose of discontinuing the control influence of the range setting member 2 on the diaphragm.

The movable stop 8, in the illustrated embodiment of the invention, comprises a lever which is mounted on a puivotal axis 9 provided on the range setting member 2 and is biased in a clockwise direction by a spring 10. One arm 8a of the lever 8 constitutes the stop or abutment proper for engagement with the arm 6 of the diaphragm-adjusting mechanism, whereas the other arm 8b has a pin 11 affixed thereto, which cooperates with a cam of the setting member 7, the said cam being composed of two sections, 7a and 7b.

When the pin 11 is located in the region of the cam section 7a, as illustrated in FIG. 1 of the drawing, the stop 8a of the lever 8 is outside of the path of movement of the arm 6 of the diaphragm adjusting mechanism, so that the control influence of the range setting member 2 on the diaphragm mechanism is discontinued. However, if for the purpose of effecting flash exposures, the manually operable setting member 7 is placed in the "flash" position for which purpose there is an index mark 12 provided on such member, the member being shifted so that the mark 12 is brought opposite the designation 13 (comprising the word "flash") the cam section 7b becomes operative and pivots the lever 8 against the action of the spring 10 so that the stop 8a is placed in the path of movement of the arm 6 of the diaphragm adjusting mechanism. During the setting movement of the diaphragm which takes place due to the action of the spring 4, the arm 6 is halted by the stop 8a in a position which is determined by the adjusted setting of the distance setting member 2.

In the case of "flash" exposures, the diaphragm value to be set substantially depends on the type of flash lamp used, on the range or distance of the subject from the camera, and also on the sensitivity of the film in the camera. The magnitude of these values can be calculated in a known manner from the so called "guide numbers" which are given for a specific film sensitivity, as for example 17/10 DIN, which guide numbers represent the product of diaphragm value and distance.

These factors which determine the setting of the diaphragm in the case of flash exposures are taken into consideration, in the camera as provided by the invention, in a simple manner by constituting the range setting member 2 in the form of two mutually adjustable members or parts 2a and 2b. The part 2a can be set with respect to a range scale 15 of the lens assemblage with the aid of an index mark 14, whereas the part 2b carries the stop lever 8 for controlling the diaphragm adjusting mechanism. For the purpose of setting the two parts 2a and 2b of the range setting member 2 in specific relative positions an identification mark scale of flash lamp types 16 is provided on one of the members, as for example on the part 2b as shown in FIG. 1, and a setting or index mark 17 cooperable with the said scale is provided on the remaining part 2a.

In order to retain the parts 2a and 2b in their respective adjusted relative positions, a releasable coupling connection is provided between the said parts. The said coupling connection comprises a slide 18 movably carried on the part 2a, and notches 2c provided on the part 2b which notches are associated with the marks of the identification scale 16 and with which the slide 18 carrying the index mark 17 is cooperable.

The guide numbers or coefficients of flash lamps are arranged as identification marks on the scale 16 in the illustrated embodiment of the invention. Thus, there appear the numbers 20, 28, 40 and 56. However, it is possible to use in place of or in addition to the said guide numbers, the trademarks or symbols of commercial flash lamps, or the identification mark scale might be in the form of symbols having different shapes and/or colors.

Moreover, for the purpose of taking into consideration different film sensitivies in flash exposures, there might be arranged instead of the single index mark 17 a film sensitivity scale the values of which are settable with respect to the identification marks of the scale 16. Such film sensitivity scale is indicated diagrammatically herein by the graduations X provided on the part 2a of the range setting member 2.

For the purpose of relieving the operator of any mental work with respect to obtaining the correct diaphragm setting when effecting or carrying out flash exposures, and also to bring about an automatic setting of the diaphragm in response to the prevailing light conditions where daylight exposures are to be made, an additional shiftable stop for the diaphragm adjusting mechanism is provided on a control member which is connectable to a light intensity measuring device. The said additional stop can be shifted into the path of movement of the arm 6 of the diaphragm adjusting mechanism in response to placing the setting and selector member 7 at the position which is identified by the word "auto" and which differs from the "flash" position, being thus illustrated in FIG. 1.

The device for effecting an automatic setting of the diaphragm when taking daylight exposures comprises a sensing member 19 which is adapted to sense in a well known manner the position of the movable member of the measuring mechanism of an electric exposure meter which is built into the camera, such sensing occurring in response to actuation of the camera release member 3.

The sensing member 19 which may, for example, be constructed in the form of a slide provided on a fixed member or portion of the measuring mechanism of the exposure meter, is vertically movable as seen in FIG. 1 and is influenced or biased by a compression spring 20 which tends to maintain it in engagement with a collar 3a of the camera release plunger 3. The spring 20 is weaker than and readily overcome by a spring 21 which biases the release plunger 3 upward, as seen in FIG. 1, to the starting position. For cooperation with the movable member of the measuring mechanism of the exposure meter, the sensing member 19 has a stepped edge or cam 19a which engages, upon actuation of the release plunger 3 and under the action of the spring 20, a needle 23 which is supported by a base member or surface 22 and is connected with the measuring mechanism. In FIG. 2 the needle 23 is shown as comprising the deflectable portion of a galvanometer G constituting the measuring mechanism, the said galvanometer being connected in a series-circuit having a current regulating rheostat R and with a photo-electric element P.

A lever 25 serves to connect the sensing member 19 to the control member 24 of the automatic setting mechanism. The lever 25 is pivotally carried by an axis 26 mounted on the camera, and when in its non-influenced state or position, it is maintained in engagement with a fixed pin 28 as shown, by means of a spring 27. The lever 25 has a bent arm or lug 25a located in the path of movement of the sensing member 19, as will be understood.

There is also provided on the control member 24 a stepped setting edge or cam 24a the individual steps of which are associated with and representative of different exposure values located in the operating range of the camera. The lever 25 cooperates with the stepped edge 24a in such a manner that the member 24 is halted, when being shifted from right-to-left under the action of a driving mechanism to be described below, by virtue of engagement of the tip or point of the lever with one of the steps 24a.

The movable stop which serves to limit the extent of movement of the diaphragm adjusting mechanism in the case of making daylight exposures is constructed in the same manner as the stop 8 which is associated with the range setting member 2. Such stop comprises a lever 29 which is pivotally carried by an axis 30 provided on the control member 24 and which engages a pin 32 of the control member under the action of a biasing spring 31. One arm 29a of the lever 29 constitutes the stop which is engageable with the arm 6 of the diaphragm adjusting mechanism, whereas the other arm 29b has a pin 33 affixed thereto and which is engageable with a cam 7c, 7d, 7f of the manually operable setting and selector member 7. The setting motion of the diaphragm adjusting mechanism in the case of daylight exposures is controlled as follows: Upon the manually operable setting and selector member 7 being placed in the "auto" position as shown in FIG. 1, the lever 29 occupies the position illustrated wherein the portion 29a thereof is located in the path of movement of the arm 6 of the diaphragm adjusting mechanism. The extent of movement of the diaphragm adjusting mechanism in shifting from its starting position is thus determined by the stop 29, 29a which is connected to the exposure meter by means of the members 24, 25 and 19.

However, when the setting and selector member 7 is placed in the "flash" position for the purpose of making flash exposures, the lever 29 is pivoted against the action of its spring 31 by means of the cam 7d of the setting member 7 whereby the portion 29a thereof is shifted out of the path of movement of the arm 6 of the diaphragm adjusting mechanism. The earlier described stop lever 8 which is provided on the range setting member 2 now takes the place of the stop 29, 29a for the purpose of limiting the extent of movement of the diaphragm adjusting mechanism comprising the arm 6.

For the purpose of effecting certain other kinds of exposures, such as B exposures for example, it is necessary that the diaphragm aperture be freely adjustable by the operator without respect to automatic setting mechanisms. Such accessibility to and adjustment of the diaphragm is had, in the camera as provided by the invention, in a simple manner by arranging the manually operable setting and selector member 7 to have a "manual" setting range which is identified with a diaphragm scale 34 and which range differs from the "flash" and "auto" positions described above. Further, there is provided a setting or "manual-adjuster" stop 7e for the diaphragm adjusting mechanism comprising the arm 6, the said stop being carried by the member 7 and being located in its operative position in response to placing the member 7 in the "manual" setting range.

Upon such positioning of the setting member 7 at any value in the diaphragm scale 34, the two stop levers 8 and 29 are shifted out of the path of movement of the arm 6 of the diaphragm adjusting mechanism by means of the cam members 7a and 7f. For the purpose of limiting the extent of movement of the diaphragm adjusting mechanism with the levers 8 and 29 rendered inoperative, the function of such levers is taken over by the stop 7e which is provided on the setting and selector member 7 and which now is engageable by the arm 6 of the diaphragm adjusting mechanism. When the said adjusting mechanism runs down under the action of the spring 4, the arm 6 will strike the stop or shoulder 7e and be halted thereby, thus effecting the desired diaphragm aperture.

For the purpose of retaining the setting and selector member 7 in its different adjusted positions, especially with respect to the range of the diaphragm scale 34, it is possible to provide a detent device of any well-known kind in connection with such member or else to secure the member against movement by frictional engagement in a well-known manner. By the same token the range setting member 2 can be secured or retained in its various adjusted positions associated with the range scale 15, by similar means.

As already mentioned, a driving device is associated with the control member 24, by means of which the said member is automatically shifted from right to left. The said driving mechanism is diagrammatically illustrated in FIG. 1, and comprises a spiral spring 35 having one end secured to the axis or bearing pin 36 of a gear 37 whereas the other end of the spring is connected to the gear. The gear 37 meshes with rack teeth 24b provided on the control member 24.

The cocking of the driving device, as well as the stressing of the spring 4 associated with the diaphragm adjusting mechanism is done jointly in response to actuation of the film transport of the camera, this being effected by means of a cocking member 38 which is cooperable with the control member 24 and with the arm 6 of the diaphragm adjusting mechanism. Provided on the cocking member 38 are arms 38a and 38b which together with the arm 24c of the control member and the arm 6 of the diaphragm adjusting mechanism comprise driving devices for the control member and for the diaphragm adjusting mechanism, said driving devices being operative unilaterally in the direction of cocking.

Also, in engagement with the cocking member 38 is another driving mechanism for a release device (not shown for reasons of clarity) associated with the camera shutter. The said other driving mechanism comprises a spring 39 and a gear 41 which latter is connected with one end of the spring 39 to be stressed thereby. The gear 41 is turnable about a bearing or axis 40, and meshes with rack teeth 38c provided on the cocking member 38. The driving spring 39 is at its other end affixed to the bearing pin 40, as will be understood. The cocking of the said other driving device is effected by means of the film transport device of the camera through a gear drive or train which connects the gear 41 and the film transport lever 42, the said gear train being indicated symbolically by the broken connecting line 43.

The setting movement of the diaphragm adjusting mechanism and the release of the camera shutter are chronologically adjusted or related to each other in such a way that the diaphragm reaches its required adjusted position as determined by the stops 7e, or 8a, or 29a prior to opening of the camera shutter, as will be understood. For this purpose, there may be used for example a delayed action device (not shown for reasons of clarity) of a well-known kind, which is releasable in response to actuation of the camera shutter, and by means of which the moment of actual opening of the shutter can be delayed by a certain time with respect to the actuation of the camera release plunger 3. The length of time is so selected that the control member 24 is able to travel the maximum required distance, and so that vibrations in the camera which are possibly caused by the running down of the control member, the diaphragm and cocking members are able to die out.

The range or distance (also termed herein the "partial scope of movement") which is available in the case of flash exposures is determined by the diaphragm setting range or scope of the particular objective or lens assemblage utilized, by the type of flash lamp used, and by the sensitivity of the film being employed. In order reliably to insure that upon setting the camera for flash exposures, the range setting member 2 always occupies a position within the said partial scope or permissible range, a further construction provided by the invention involves a safety device which shifts the range setting member into the said partial scope or permissible range in response to movement of the manually operable setting and selector member 7 in the "flash" position.

The said safety device comprises, in the illustrated embodiment of the invention, a driving arm or abutment 7f which is provided on the setting and selector member 7 and also an abutment or pin 44 which is affixed to the setting and selector member. The arm 7f cooperates with an arm 2d provided on the member 2b of the range setting part 2, while a two-armed lever 47 having a fixed bearing support 45 and cooperating with a pin 46 on the part 2b of the range-setting member 2 is shifted by means of the pin 44 in response to placement of the setting and selector member 7 in the "flash" position. A spring influences the lever 47 and biases the same in a clockwise direction, tending to keep it in the inoperative position shown in FIG. 1.

The mode of operation of the last described safety device is as follows:

If the range setting member 2 is placed, in the course of utilizing an automatic diaphragm setting for laylight exposures, at the range or distance value "infinite," the arm 7f of the setting and selector member 7 will engage (when the said setting and selector member is placed in the "flash" position) the arm 2d of the range setting member and will move the latter back or to the left, to the correct limiting value of the distance range which is available for the flash exposure. This limiting value comprises, in the illustrated embodiment of the invention, the distance 7m, figured on the basis of a particular diaphragm setting range of the lens assemblage and a particular flash lamp guide number. That is, the range setting member 2 will be shifted from right to left by engagement between the arms 7f and 2d, until the index mark 14 is brought to the number 7 on the distance scale 15.

If, on the other hand, the guide number 56 is chosen on the guide number scale 16 and the distance 0.9 m. is selected on the range scale 15, the lever 47 will engage, in response to placement of the setting and selector member 7 in the "flash" position, the pin 46 of the range-setting member 2 and will move the same to the right to such an extent that the index 14 will be opposite the left limiting value of the range scale which is available for flash exposures. Such limiting value may, for example, be the distance 2.5 m. on the scale 15. Thus, the range for flash exposures at the scale 15 would extend in this latter case from 2.5 m. to 20 m.

In order to make sure, additionally, that the permissible range for flash exposures cannot be inadvertently exceeded when setting for the distance, another safety device is provided which can be rendered operative in response to placing the setting and selector member 7 in the "flash" position, and which for flash exposures will prevent the range setting member 2 from shifting beyond the permissible range.

In an economical manner as such other safety device is used the lever 47 cooperating with the pin 46 of the range setting member 2 and the arm 2d provided on the part 2b of the range setting member. For this purpose, the lever 47 is secured into its position associated with the "flash" setting whereby it serves as a stop for the pin 46, by means of the pin 44 provided on the setting and selector member 7, whereas a stop for the arm 2d is constituted by an arresting lever 49 which has a fixedly secured bearing 48 and which is shifted against spring action into the path of a projection 2e provided on the arm 2d, all in consequence of the setting and selector member 7 being placed in the "flash" position, such shifting of the lever 49 being effected by a control cam 7g provided on the setting member 7.

The above described camera operates in the following manner:

(a) Effecting an exposure with automatic diaphragm setting, in daylight.

For this purpose, the manually operable setting and selector member 7 is placed in the automatic position as shown in FIG. 1. For such position, the stop lever 29 associated with the control member 24 is shifted into the path of movement of the arm 6 by means of the cam 7c, whereas the stop lever 8 provided on the range setting member 2 as well as the stop 7e associated with the setting member 7 are disposed outside of the path of movement of the arm 6.

If the device is in the cocked position as shown in FIG. 1, an exposure can be effected by merely depressing the camera release member 3. Due to the action of the spring 20, the sensing member 19 follows the movement of the release member 3, whereby the measuring mechanism needle 23 is clamped by means of a clamping lever 50 in a well-known manner. The sensing member 19 then engages the lever 25 and pivots the same against the action of the spring 27 until one of the steps 19a of the sensing member impinges on the measuring mechanism needle 23 and thereby terminates the movement of the sensing member. At the same time, the cocking member 38 and the control member 24 as well as the camera shutter mechanism (the latter not being shown) are released by means of the camera release member 3, whereupon when the shutter release has been effected, the above mentioned delayed action mechanism (not shown) becomes operative in a manner described earlier and prevents an immediate opening of the shutter blades.

The control member 24, in being released for running down movement from right-to-left, engages after a longer or shorter extent of movement the lever 25 which has been pre-set by the sensing lever 19. Such engagement occurs between the said lever and one of the steps 24a of the member 24. The diaphragm adjusting mechanism follows such movement of the control member 24 because of the action of the diaphragm biasing spring 4, and is halted due to the arm 6 impinging on the stop lever 29 of the adjusted control member, in a position corresponding to the prevailing light intensity and to the setting of additional exposure factors such as the exposure time and film sensitivity. This ends the automatic diaphragm setting in the case of daylight exposures.

(b) Flash exposures with automatic diaphragm setting.

In order to effect such exposures, the manually operable setting and selector member 7 is first placed in the "flash" position, whereby the stop lever 29 associated with the control member 24 is shifted out of the path of movement of the arm 6 of the diaphragm adjusting mechanism by means of the cam 7d on the setting and selector member 7. Simultaneously, the stop lever 8 of the range setting member 2 is shifted into operative position with the aid of the cam 7b. In addition, the type of flash lamp to be used is set on the identification mark scale 16, by means of the index mark 17, and further the distance or range of the object to be photographed is set on the range scale 15.

After the above mentioned settings have been effected, a photograph may be taken by merely depressing the camera release member 3. In so doing, the stop lever 8 which is connected to the range setting member 2 is decisive for the adjustment of the diaphragm, the said stop lever halting the diaphragm adjusting mechanism in its running down movement from the starting position under the action of the spring 4 by virtue of impingement of the arm 6 on the lever 8. The altered position of the diaphragm adjusting mechanism corresponds then to the distance which is set and to the type of flash lamp used.

(c) Exposures involving non-automatic diaphragm settings.

It is merely necessary to place the setting and selector member 7 so that the index mark thereof designates the desired diaphragm value on the scale 34. Upon this being accomplished, a cam 7f of the setting and selector member 7 engages the pin 33 of the stop lever 29, pivoting the latter in a counterclockwise direction so that its stop portion 29a is shifted out of the path of movement of the arm 6 of the diaphragm adjusting mechanism. Likewise, the stop lever 8 which is associated with the range setting member 2 is held in the inoperative position by the spring associated with it. This makes the setting stop 7e provided on the setting member 7 operative for the setting of the diaphragm. The arm 6 of the diaphragm adjusting mechanism, having been released by the arm 38b of the cocking member 38, impinges on the stop 7e and such engagement, effected under the action of the spring 4, places the diaphragm in the desired adjusted condition.

The control member 24 as well as the cocking member 38 and the manually operable setting member 7 are drawn, in FIG. 1, as longitudinally displaceable slide-like structures for the purpose of obtaining a simple and quick understanding of the invention. However, this showing implies no limitation with respect to the construction of the members in question. On the contrary, upon realizing or incorporating the invention in a specific camera, the members may be constructed in any appropriate manner, as for example in the form of slides, rings or disks. Likewise, instead of the movable stops which are used in the illustrated embodiment being in the form of pivotal levers, the said stops may be slide-like members, which can be operated in an appropriate manner by means of actuating members arranged on the setting and selector member 7.

I claim:
1. A photographic camera comprising, in combination:
 (a) a camera release member,
 (b) a range-setting member,
 (c) a diaphragm-adjusting member having, for the non-influenced condition of the camera release member, a starting position corresponding to one extreme aperture size,
 (d) spring means biasing the diaphragm-adjusting member to a position corresponding to the opposite extreme aperture size,
 (e) means rendered inoperative in response to actuation of the camera release member, for normally holding the diaphragm-adjusting member in said starting position,
 (f) a movable stop on the range-setting member,
 (g) a movable counter-stop cooperable with said movable stop and connected with the diaphragm-adjusting member to control the movement of the latter,
 (h) a manually operable setting and selector member positionable in a "flash" position and at least one other position, said positions being identifiable by markings,
(i) means responsive to movement of the setting and selector member from the "flash" position to said other position, for shifting the movable stop out of the path of movement of the counter-stop, thereby to eliminate the control influence of the range-setting member on the diaphragm adjusting member.

2. A camera as in claim 1, wherein:
(a) the range-setting member comprises two mutually relatively adjustable parts,
(b) there is a range scale cooperable with one of said parts,
(c) the movable stop is carried by the other of said parts,
(d) there is an identification mark scale and a cooperable setting mark associated with said parts and utilized when the parts are relatively adjusted.

3. A camera as in claim 1, wherein:
(a) there is an automatic exposure regulator,
(b) said regulator has a movable control member,
(c) there is another movable stop cooperable with said counter-stop and carried by the control member,
(d) the other position of the setting and selector member is identified by the word "auto,"
(e) there are means responsive to movement of the setting and selector member from the "flash" to the "auto" position, for shifting the other movable stop into the path of movement of the counter-stop to effect automatic setting of the diaphragm in accordance with prevailing light conditions.

4. A camera as in claim 3, wherein:
(a) the setting and selector member has a "manual" setting range differing from the "flash" and "auto" positions,
(b) there is a diaphragm scale means which is usable when the setting and selector member is moved to the "manual" setting range,
(c) there is a manual-adjuster stop connected to the setting and selector member and cooperable with the diaphragm adjusting member, said manual-adjuster stop being moved to an operative position when the setting and selector member is moved to the "manual" setting range.

5. A camera as in claim 1, wherein:
(a) the range-setting member has a partial scope of movement which is determined by the diaphragm scope and by the type of flash lamp used,
(b) there are means for shifting the range setting member into said partial scope in response to the setting and selector member being placed in the "flash" position.

6. A camera as in claim 5, wherein:
(a) the range-setting member comprises two mutually relatively adjustable parts,
(b) the movable stop is carried by one of said parts,
(c) the means for shifting the range-setting member to said partial scope comprises two abutments on the setting and selector member, which are cooperable with the said one part of the range-setting member,
(d) one abutment is operative to shift the range-setting member, in response to movement of the setting and selector member to the "flash" position, in the same direction as such movement,
(e) there is a motion-reversing device cooperable with the other abutment to shift the range-setting member in an opposite direction in response to such movement of the setting and selector member,
(f) the particular direction of shift of the range-setting member depends on the initial position of the same.

7. A camera as in claim 6, wherein:
(a) the motion-reversing device comprises a two-armed lever which is pivotally mounted on a fixed part of the camera,
(b) one arm of the two-armed lever is located in the path of movement of the said other abutment,
(c) there is a projection on the said one part of the range-setting member, which is cooperable with the other arm of the two-armed lever.

8. A camera as in claim 1, wherein:
(a) the range-setting member has a partial scope of movement which is determined by the diaphragm scope and by the type of flash lamp used,
(b) there are releasable safety means including a member movable between operative and inoperative positions, for retaining the range-setting member in said partial scope,
(c) there are means responsive to the setting and selector member being placed in the "flash" position, for rendering operative the safety means.

References Cited in the file of this patent
UNITED STATES PATENTS

| | | |
|---|---|---|
| 2,969,004 | Gebele | Jan. 24, 1961 |
| 2,985,082 | Starp | May 23, 1961 |
| 2,993,422 | Rentschler | July 25, 1961 |
| 2,999,439 | Nerwin | Sept. 12, 1961 |
| 2,999,441 | Hutchison | Sept. 12, 1961 |